United States Patent
Li et al.

(10) Patent No.: US 12,309,303 B2
(45) Date of Patent: May 20, 2025

(54) VERIFICATION REQUIREMENT DOCUMENT FOR CREDENTIAL VERIFICATION

(71) Applicant: TBCASOFT, INC., Sunnyvale, CA (US)

(72) Inventors: Chiahsin Li, San Jose, CA (US); Andrew Tully, Santa Clara, CA (US)

(73) Assignee: TBCASOFT, INC., Sunnyvale, CA (US)

( * ) Notice: Subject to any disclaimer, the term of this patent is extended or adjusted under 35 U.S.C. 154(b) by 184 days.

(21) Appl. No.: 17/769,758

(22) PCT Filed: Oct. 19, 2020

(86) PCT No.: PCT/US2020/056388
§ 371 (c)(1),
(2) Date: Apr. 18, 2022

(87) PCT Pub. No.: WO2021/077118
PCT Pub. Date: Apr. 22, 2021

(65) Prior Publication Data
US 2022/0294653 A1      Sep. 15, 2022

Related U.S. Application Data

(60) Provisional application No. 62/923,471, filed on Oct. 18, 2019.

(51) Int. Cl.
*H04L 9/00* (2022.01)
*H04L 9/32* (2006.01)

(52) U.S. Cl.
CPC .............. *H04L 9/50* (2022.05); *H04L 9/3218* (2013.01)

(58) Field of Classification Search
CPC ................................ H04L 9/50; H04L 9/3218
See application file for complete search history.

(56) References Cited

U.S. PATENT DOCUMENTS

| | | |
|---|---|---|
| 2011/0289403 A1 | 11/2011 | McDonald |
| 2014/0281525 A1 | 9/2014 | Acar et al. |

(Continued)

FOREIGN PATENT DOCUMENTS

| | | |
|---|---|---|
| CN | 105264819 A | 1/2016 |
| CN | 105264819 B | 1/2019 |

(Continued)

OTHER PUBLICATIONS

Taiwan Intellectual Property Office mailed Search Report along with Reference List on Jul. 7, 2022, in Taiwan application No. 109141616, filed on Aug. 10, 2021.

(Continued)

*Primary Examiner* — Brian Whipple
(74) *Attorney, Agent, or Firm* — Huan-Yi Lin

(57) ABSTRACT

The present disclosure is directed to a method and related apparatus and computer readable medium for credential verification using verification requirement document (VRD). A VRD credential verification ecosystem may include but is not limited to a VRD administration system, a first credential management system, a second credential management system, a VRD issuing device, a verifier device, a distributed VRD transaction consensus network, and a distributed credential management transaction consensus network with necessary communication among them.

27 Claims, 10 Drawing Sheets

(56) References Cited

U.S. PATENT DOCUMENTS

| | | | |
|---|---|---|---|
| 2015/0244690 A1 | 8/2015 | Mossbarger | |
| 2016/0239653 A1 | 8/2016 | Loughlin-Mchugh et al. | |
| 2017/0230375 A1 | 8/2017 | Kurian | |
| 2018/0083771 A1 | 3/2018 | Bonnell | |
| 2018/0268151 A1 | 9/2018 | Cuomo et al. | |
| 2018/0270065 A1 | 9/2018 | Brown et al. | |
| 2019/0158298 A1 | 5/2019 | Muftic | |
| 2019/0305949 A1 | 10/2019 | Hamel et al. | |

FOREIGN PATENT DOCUMENTS

| | | | |
|---|---|---|---|
| CN | 109446842 A | 3/2019 |
| JP | 2002163395 A | 6/2002 |
| JP | 2008228089 A | 9/2008 |
| TW | 201947482 A | 12/2019 |
| TW | 202029690 A | 8/2020 |
| TW | 202036345 A | 10/2020 |

OTHER PUBLICATIONS

Schanzenbach, M. et at. ZKlaims: Privacy-Preserving Attribute-Based Credentials Using Non-interactive Zero-knowledge Techniques. arXiv preprint arXiv:190709579(pp. 1-8). Jul. 22, 2019[retrieved on Dec. 15, 2020]. Retrieved from the Internet:<https://arxiv.org/pdf/1907/09579.pdf>; entire document, especially p. 1, col. 1, para3-4, p. 3, col. 1, para7, p. 3, col. 2, para1, p. 4, col. 1, para4-pa5, col. 2, para1, p. 7, col. 1, para4, Fig. 1.

Wang, D. (editor) Technical Report FG DLT D5.1 Outlook on Distributed Ledger Technologies. ITU-T Focus Group on Application of Distributed Ledger Technology, International Telecommunication Union. Aug. 23, 2019. [retrieved on Dec. 15, 2020]. Retrieved from the Internet: <https://www.itu.int/en/ITU-T/focusgroups/dlt/Documents/d51.pdf>; entire document.

International Search Report and Written Opinion mailed on Jan. 25, 2021 in International Patent Application No. PCT/US2020/056388, filed on Oct. 19, 2020.

| TRANSACTION TYPE | VRD TRANSACTION |
| --- | --- |
| 1 | VRD OPERATOR REGISTERING TRANSACTION |
| 2 | VRD OPERATOR REVOKING TRANSACTION |
| 3 | VRD ISSUER REGISTERING TRANSACTION |
| 4 | VRD ISSUER REVOKING TRANSACTION |
| 5 | VRD REGISTERING TRANSACTION |
| 6 | VRD REVOKING TRANSACTION |
| 7 | VRD RETRIEVING TRANSACTION |

FIG.2

| Field of transaction | Public key of VRD operator | DID of VRD operator | Signature of VRD administer | DID of VRD administer |
|---|---|---|---|---|
| Description | Public key of the VRD operator to be registered | DID of the VRD operator to be registered | Signature of the VRD administer registering the VRD operator on all other fields | DID of the VRD administer registering the VRD operator |

FIG. 3

| Field of transaction | DID of VRD operator | Signature of VRD administer | DID of VRD administer |
|---|---|---|---|
| Description | DID of the VRD operator to be registered | Signature of the VRD administer registering the VRD operator on all other fields | DID of the VRD administer registering the VRD operator |

FIG. 4

| Field of transaction | Public key of VRD issuer | DID of VRD issuer | Signature of VRD operator | DID of VRD operator |
|---|---|---|---|---|
| Description | Public key of the VRD issuer to be registered | DID of the VRD issuer to be registered | Signature of the VRD operator registering the VRD issuer on all other fields | DID of the VRD operator registering the VRD issuer |

FIG. 5

| Field of transaction | DID of VRD issuer | Signature of VRD operator | DID of VRD operator |
|---|---|---|---|
| Description | DID of the VRD issuer to be revoked | Signature of the VRD operator revoking the VRD issuer on all other fields | DID of the VRD operator revoking the VRD issuer |

FIG. 6

| Field of transaction | VRD ID | VRD Name | Version | ID of VRD operator | DID of VRD issuer | Signature of VRD issuer | Attribute | Predicate |
|---|---|---|---|---|---|---|---|---|
| Description | ID of the VRD to be created | Name of the VRD to be created | Current version of the VRD | Application-specific ID for VRD | DID of the VRD issuer creating the VRD | Signature of the VRD issuer creating the VRD on all other fields | At least one attribute identifying at least one credential with the at least one attribute | At least one predicate identifying at least one credential to verify the at least one predicate |

FIG. 7

| Field of VRD transaction | Attribute | | Predicate | | | | | |
|---|---|---|---|---|---|---|---|---|
| Subfields | Attribute name | Reveal choice | Requirement | Predicate name | Predicate character | Predicate attribute | Predicate value | Predicate type | Requirement |
| Description | The name of an attribute of a credential identified by the requirement | The option to permit or deny the plaintext or value of an attribute to be revealed | One or more search conditions that can be combined by Boolean operators to identify at least one credential of the credential owner | A name of the predicate | A character derived from or associated with an attribute | An attribute of a credential identified by the requirement | A value to compared with the value of the predicate character | Property of comparison relation | One or more search conditions that can be combined by Boolean operators to identify at least one credential of the credential owner |

FIG. 8

| Field of transaction | Signature of VRD issuer | DID of VRD issuer | VRD ID |
|---|---|---|---|
| Description | Signature of the VRD issuer revoking the VRD on all other fields | DID of the VRD issuer revoking the VRD | ID of the VRD to be revoked |

FIG. 9

VERIFICATION REQUIREMENT DOCUMENT FOR CREDENTIAL VERIFICATION

1. RELATED APPLICATION

This application claims the benefit of provisional application 62/923,471, filed on Oct. 18, 2019, titled "VERIFICATION REQUIREMENTS DOCUMENT DESIGN DOCUMENT", incorporated herein by reference at its entirety.

BACKGROUND OF THE INVENTION

2. Field of the Invention

The present invention relates to a credential verification method and system and, more particularly, to a method and system for managing a distributed verification requirement document (VRD) transaction consensus network and a method and system for using a VRD stored on the distributed VRD transaction consensus network to request credential verification of a credential owner.

3. Description of the Related Art

Attributable to widespread blockchain technology, digital credentials appear to be an overwhelming trend sooner or later in place of traditional credentials possibly in most situations when their verification is required. To digital credentials is concerned, conventional blockchain technology provides tools, libraries, and reusable components in support of decentralized digital identities rooted on blockchains or other distributed systems for verification of digital credentials.

Despite the availability of conventional credential management blockchain built for verification of digital credentials, such blockchain falls short of enough flexibility in response to more customized verification requirements for verifiers. From the perspective of ubiquity of telecom carriers and globally recognized carrier services thereof, a VRD credential verification ecosystem that involves carrier-level parties and is ideally chosen to provide reliable credential verification services for digital credentials through telecom carriers. However, such VRD credential verification ecosystem is a feature not available in the conventional blockchain for digital credential management services as well.

SUMMARY OF THE INVENTION

The present disclosure is directed to a method and related apparatus and computer readable medium for credential verification using verification requirement document (VRD). A VRD credential verification ecosystem may include but is not limited to a VRD administration system, a first credential management system, a second credential management system, a VRD issuing device, a verifier device, a distributed VRD transaction consensus network, and a distributed credential management transaction consensus network with necessary communication among them. A distributed VRD transaction consensus network maintains a distributed VRD ledger to record VRDs. The VRD transactions to be published to the distributed VRD ledger include VRD operator registering transaction, VRD operator revoking transaction, VRD issuer registering transaction, VRD issuer revoking transaction, VRD registering transaction, VRD revocation transaction, and VRD retrieving transaction.

The credential verification using VRD is performed primarily by a first credential management system associated with a verifier and a second credential management system associated with a credential owner. The first credential management system retrieves VRD from the distributed VRD transaction consensus network and sends the VRD to the second credential management system. The second credential management system generates a proof through a distributed credential management transaction consensus network to verify the requirements specified in VRD.

An objective of the present disclosure is to create and record VRDs in the distributed VRD ledger so that a verifier can choose an existing VRD for credential verification. To achieve the foregoing objective, a first credential management system uses a verification requirement document (VRD) stored on a distributed VRD transaction consensus network to request credential verification of a credential owner. The method includes:

when receiving a VRD ID of the VRD and a credential owner identifier from a verifier device, the first credential management system sending the VRD ID to the distributed VRD transaction consensus network to obtain the VRD, and sending the VRD and the credential owner identifier to a second credential management system, wherein the VRD includes at least one attribute, at least one predicate, or both at least one attribute and at least one predicate with a requirement defining at least one type of credential for verifying each of the at least one attribute and each of the at least one predicate specified in the VRD.

In one embodiment, the method further includes:

the first credential management system receiving a proof from the second credential management system and confirming if the proof satisfies the requirement associated with each of the at least one attribute and the at least one predicate specified in the VRD;

when each requirement is satisfied, the first credential management system sending the proof and the at least one attribute and the at least one predicate specified in the VRD to a distributed credential management transaction consensus network for validation; and upon receiving a verification response from the distributed credential management transaction consensus network, the first credential management system sending a credential verification result to the verifier device.

Other objectives, advantages and novel features of the invention will become more apparent from the following detailed description when taken in conjunction with the accompanying drawings.

BRIEF DESCRIPTION OF THE DRAWINGS

FIG. 2 is a table showing various VRD transactions for a distributed VRD transaction consensus network in accordance with the present invention;

FIG. 3 is a table showing data structure associated with a VRD operator registering transaction;

FIG. 4 is a table showing data structure associated with a VRD operator revoking transaction;

FIG. 5 is a table showing data structure associated with a VRD issuer registering transaction;

FIG. 6 is a table showing data structure associated with a VRD issuer revoking transaction;

FIG. 7 is a table showing data structure associated with a VRD registering transaction;

FIG. 8 is a table showing data structure associated with each attribute and each predicate specified in the VRD registering transaction of FIG. 7;

FIG. 9 is a table showing data structure associated with a VRD revoking transaction.

DETAILED DESCRIPTION OF THE INVENTION

Figure 1:
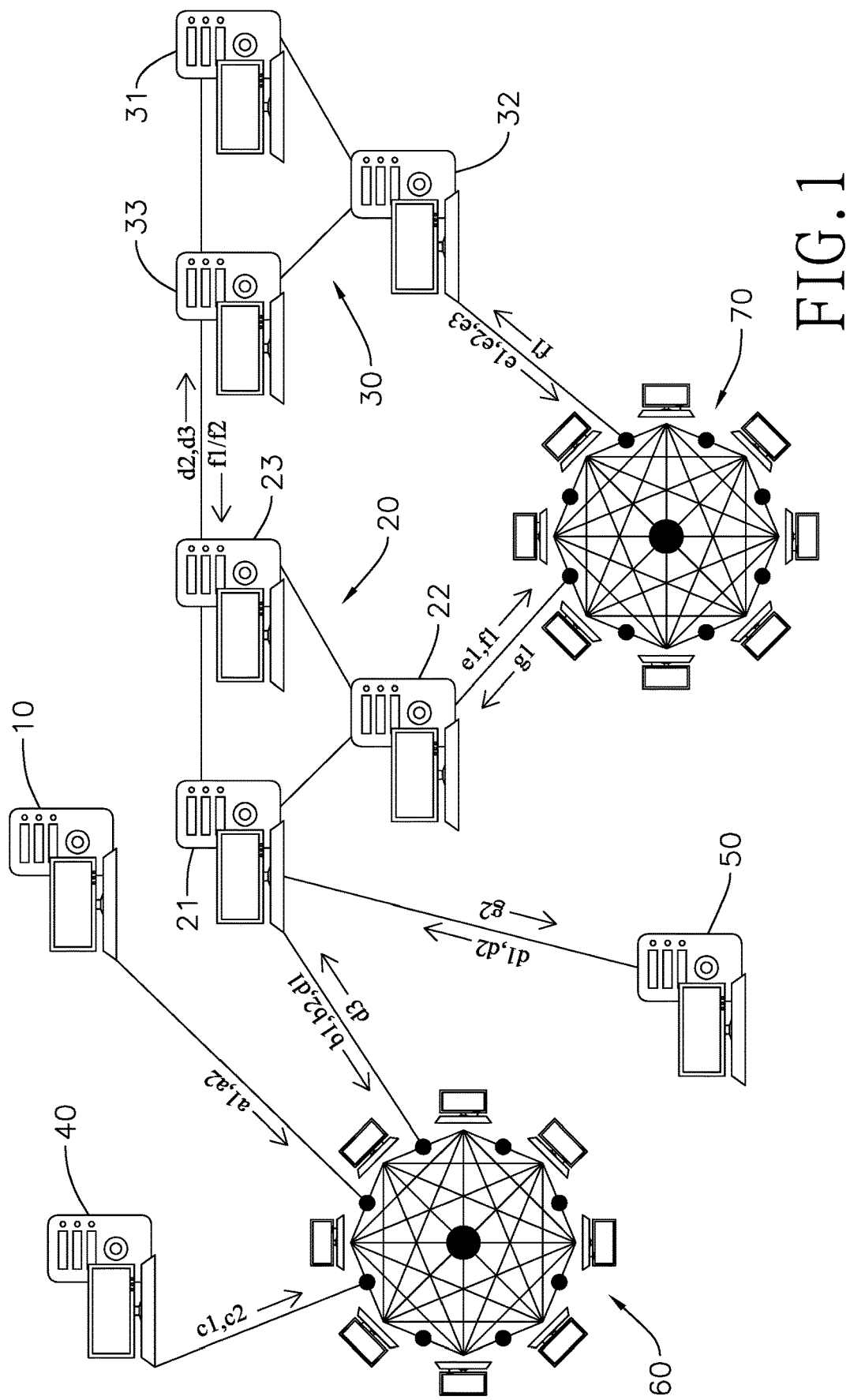
FIG. 1 is a schematic diagram showing system architecture involved with VRD operation in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The described embodiments concern one or more methods, systems, apparatuses, and computer readable mediums storing processor-executable process steps for verifying credentials of a credential owner by using verification requirement document (VRD), a data structure recording the type and requirement of credential, issued by a VRD issuer. The VRDs are stored in a distributed VRD ledger maintained by a distributed VRD transaction consensus network. The distributed VRD ledger may record one or more of the following transactions: VRD operator registering transaction, VRD operator revoking transaction, VRD issuer registering transaction, VRD issuer revoking transaction, VRD registering transaction, VRD revoking transaction, and VRD retrieving transaction. In addition, a distributed credential transaction consensus network maintains a distributed credential management ledger to provide a proof of a credential request and to verify a proof.

The aforementioned process steps are performed by the VRD credential verification ecosystem, which includes a VRD administer system, a first credential management system, a second credential management system, a verifier device, and a VRD issuing device, which are communicatively connected to each other and to the distributed VRD transaction consensus network and the distributed credential management transaction consensus network to form a credential verification network.

To create a VRD operator, the VRD administer publishes a VRD operator registering transaction to the distributed VRD ledger to register the VRD operator in the distributed VRD transaction consensus network. The VRD operator may be revoked by the VRD administer to publish a VRD operator revoking transaction to the distributed VRD ledger to remove the VRD operator from the distributed VRD transaction consensus network. To create a VRD issuer, a VRD operator publishes a VRD issuer registering transaction to the distributed VRD ledger to register the VRD issuer in the distributed VRD transaction consensus network. The VRD issuer may be revoked by the VRD operator to publish a VRD issuer revoking transaction to the distributed VRD ledger to remove the VRD issuer from the distributed VRD transaction consensus network. To create a VRD, the VRD issuer publishes a VRD registering transaction to the distributed VRD ledger. Each of the VRD includes a VRD ID, and at least one attribute, at least one predicate or both the at least one attribute and the at least one predicate. Each of the at least one attribute or the at least one predicate specified in the VRD specifies a requirement to seek at least one credential for verification.

The gist of the verification resides in acquiring VRD with a VRD ID given by the verifier device, transferring the VRD and the user identifier from the first credential management system to the second credential management system, identifying a set of credentials which satisfy each requirement specified in the VRD, sending a handle to the wallet corresponding to the user identifier, and a list of the at least one attribute and the at least one predicate specified in the VRD to a distributed credential management transaction consensus network, acquiring a proof received from the distributed credential management transaction consensus network, sending the proof to the first credential management system to confirm against the VRD, after the confirmation, sending the proof and the proof request to the distributed credential management transaction consensus network to acquire a verification response from the distributed credential management transaction consensus network, and sending a verification result to the verifier device.

VRDs are used to resolve the inflexible credential verification services provided by conventional credential management blockchains. This approach calls for a VRD scheme rooted on a VRD credential verification ecosystem to tackle the drawbacks of inflexibility. To protect against hacking, the VRD scheme may use a distributed VRD transaction consensus network dedicated to operation and data structure dealing with transactions involved with VRDs and interaction among all parties engaging VRD operation. The distributed VRD transaction consensus network may be incorporated as a part of an existing distributed credential management transaction consensus network, such as Hyperledger Indy Blockchain. In one embodiment, the distributed VRD transaction consensus network may be a blockchain managed by an organization, such as TBCASoft®, to which a source of truth can be traced back to ensure a level of authenticity.

To support the VRD operation running on the distributed VRD transaction consensus network, the VRD credential verification ecosystem includes a VRD administer system, multiple credential management systems, multiple VRD issuing devices, and multiple verifier devices communicatively connected to each other. The VRD administer system is provided by a VRD administer, such as TBCASoft®. Each of the multiple credential management systems is provided by a credential manager which can be a corresponding VRD operato registered by the VRD administer or is a telecom carrier, verifiers and credential owners. Each of the multiple VRD issuing devices is provided by a corresponding VRD issuer. Each of the multiple verifier devices is provided by a corresponding verifier associated with a corresponding credential manager. The cooperative links specified above are non-limiting examples of the relationship between and among all the parties involved in the VRD credential verification ecosystem.

Speaking of the roles of all parties in the VRD credential verification ecosystem, the VRD administer is entitled to register and revoke the VRD operators, the VRD operators are entitled to register and revoke VRD issuers associated therewith, the VRD issuers are entitled to register and revoke VRDs, the verifiers are entitled to request credential verification of credential owners using VRDs through the credential managers associated with the verifiers, and the credential managers associated with credential owners may act as provers. As indicated above, the VRD operators on the VRD credential verification ecosystem essentially act to establish a trust link between related VRD issuers and the VRD administer for providing a source of authority for verifiers. The VRD issuers undertake the tasks of configuring the attributes/predicates with requirements defining attributes/predicates in a VRD in coordination with the verifiers and facilitating the VRDs registered to the distributed VRD transaction consensus network. Only the same VRD issuer that registered a VRD is allowed to register future versions of the VRD to the distributed VRD transaction consensus network. It is intended for both the VRD issuers and the verifiers to participate in the tasks of configuring the desired attributes/predicates and requirements of the VRD to be registered to the distributed VRD transaction consensus network.

As shown in FIG. 1, a VRD credential verification ecosystem may include but is not limited to a VRD administration system 10, a first credential management system 20, a second credential management system 30, a VRD issuing device 40, a verifier device 50, a distributed VRD transaction consensus network 60, and a distributed credential management transaction consensus network 70 with necessary communication among them specified in the next. The VRD administration system 10 is provided by a VRD administer for managing operation of the distributed VRD transaction consensus network. The first credential management system 20 is provided by a first credential manager associated a verifier. The first credential manager may be a telecom operator, a financial institute, a government agency, etc. In the present embodiment, the first credential management system 20 includes a first VRD management node 21, a first distributed credential transaction node 22, and a first local credential management node 23, which are communicatively connected. The first VRD management node 21 is responsible for all operation in connection with the distributed VRD transaction consensus network 60. The first distributed credential transaction node 22 deals with operation in connection with the distributed credential management transaction consensus network 70. The first local credential management node 23 handles credential management local to the first credential management system 20 and communication with the second credential management system 30. The second credential management system 30 is provided by a second credential manager associated with a credential owner (prover). In another embodiment, the first credential management system 20 includes one or two nodes which may perform all the functions of the first VRD management node 21, the first distributed credential transaction node 22, and the first local credential management node 23.

The second credential management system 30 includes a second VRD management node 31, a second distributed credential transaction node 32, and a second local credential management node 33, which are communicatively connected. The second VRD management node 31 is responsible for all operation in connection with the distributed VRD transaction consensus network 60. The second distributed credential transaction node 32 deals with operation in connection with the distributed credential management transaction consensus network 70. The second local credential management node 33 handles credential management local to the second credential management system 30 and communication with the first credential management system 20, for example, through a secure TLS (Transport Layer Security) link. In another embodiment, the second credential management system 30 may include one or two nodes which may perform all the functions of the second VRD management node 31, the second distributed credential transaction node 32, and the second local credential management node 33

In one embodiment, the first VRD management node 21 and the second VRD management node 31 may be the nodes of the distributed VRD transaction consensus network 60. In another embodiment, the first credential management distributed consensus transaction node 22 and the second credential management distributed consensus transaction node 32 may be nodes of the distributed credential management transaction consensus network 70. The verifier device 50 is provided by a verifier associated with the first credential manager. The credential owner device is provided by a credential owner associated with the second credential manager. The VRD issuing device 40 is provided by a VRD issuer.

In one embodiment, the first VRD management node 31 may be provided by a first VRD operator separated from the first credential manager. In that situation, the first local credential management node 23 may communicate with the distributed VRD transaction consensus network to retrieve a VRD. Similarly, the second VRD management node 31 may be provided by a second VRD operator separated from the second credential manager. In that situation, the second local credential management node 33 may communicate with the distributed VRD transaction consensus network to retrieve a VRD. Other VRD operators may provide additional VRD management nodes. After a VRD operator is published by the VRD administer to the distributed VRD ledger, the VRD operator may publish a VRD issuer to the distributed VRD ledger. Afterwards, the VRD issuer may publish a VRD to the distributed VRD ledger.

FIG. 1 illustrates the VRD credential verification ecosystem with transactions and data related to operation of the distributed VRD transaction consensus network and credential verification using VRD. Symbols a1, a2, b1, b2, c1, and c2 respectively denote operations for registering and revoking VRD operator, VRD issuer, and VRD. Symbols d1, d2, d3, e1, e2, e3, f1, f2, g1 and g2 respectively denote various data/information provided during credential verification using VRD. The meaning of these symbols is described below.

a1: VRD operator registering transaction
a2: VRD operator revoking transaction
b1: VRD issuer registering transaction
b2: VRD issuer revoking transaction
c1: VRD registering transaction
c2: VRD revoking transaction
d1: VRD ID
d2: credential owner identifier
d3: VRD
e1 and e2: the attribute and predicate list and the credential identifier of each of the at least one selected credential e3: the handle to the wallet
f1: proof
f2: indication of failure
g1: verification response
g2: verification result With reference to FIGS. 1 and 2, the distributed verification requirement document (VRD) transaction consensus network maintaining a distributed VRD ledger includes a VRD administration system provided by a VRD administer, a first VRD management node provided by a first VRD operator, a second VRD management node provided by a second VRD operator. The VRD administration system, the first VRD management node, and the second VRD administration are communicatively connected. As a distributed transaction consensus network, after a VRD transaction is validated by a predetermined consensus of the distributed VRD transaction consensus network, the VRD transaction is published to the distributed VRD ledger. In one embodiment, he VRD transactions have seven types which are VRD operator registering transaction, VRD operator revoking transaction, VRD issuer registering transaction, VRD issuer revoking transaction, VRD registering transaction, VRD revoking transaction, and VRD retrieving transaction. The distributed VRD ledger records multiple VRDs each of which includes a VRD ID, VRD name, and at least one of at least one attribute and at least one predicate.

The distributed VRD transaction consensus network begins with a genesis transaction publishing the VRD administer to the network. The DID of the VRD administer is a globally unique identifier that identifies the VRD administer who can register the VRD operator identified by the VRD operator's DID on the distributed VRD transaction consensus network. For example, the DID of the VRD administer may be 'vrd-administer-01'.

As shown in FIG. 2, the first type of VRD transaction is VRD operator registering transaction. With reference to FIG. 3, the data structure of the VRD operator registering transaction includes fields of a transaction type with a value such as 1, a public key and a DID (Decentralized ID) of the VRD operator to be registered, and a signature and a DID of the VRD administer. As shown by 'a1' in FIG. 1, the VRD operator registering transaction created by the VRD administer is submitted from the VRD administration system to the distributed VRD transaction consensus network. The signature of the VRD administer can then be verified by a public key of the VRD administer stored in the distributed VRD transaction consensus network. With the predetermined consensus, the VRD operator registering transaction is published to the distributed VRD ledger. As a result, the VRD operator is capable of registering a VRD issuer. In addition, the public key of the VRD operator is stored in the distributed VRD transaction consensus network for verifying a signature of the VRD operator. The VRD operator's DID is a "string" data type and is a globally unique identifier that identifies the VRD operator in the distributed VRD transaction consensus network. For example, the VRD issuer's DID may be "vrd-operator-01." The signature of the VRD administer is generated by encrypting a hash value of hashing all other fields of the VRD operator registering transaction with a private key of the VRD administer.

As shown in FIG. 2, the second type of VRD transaction is VRD operator revoking transaction. With reference to FIG. 4, the data structure of the VRD operator revoking transaction includes fields of a transaction type with a value such as 2, a DID of a registered VRD operator, and a DID and a signature of the VRD administer. The signature of the VRD administer is generated by encrypting a hash value of hashing all other fields of the VRD operator revoking transaction with a private key of the VRD administer. As shown by "a2" in FIG. 1, the VRD operator revoking transaction is created by the VRD administrator and submitted from the VRD administration system to the distributed VRD transaction consensus network, the signature of the VRD administer can be verified by a public key of the VRD administer stored in the distributed VRD transaction consensus network. With the predetermined consensus, the VRD operator revoking transaction is published to the distributed VRD ledger. The previously registered VRD operator identified by the DID of the VRD operator is then revoked by the VRD administer identified by the DID of the VRD administer who registered the VRD operator. As a result, the VRD operator is no longer capable of registering a VRD issuer.

As shown in FIG. 2, the third type of VRD transaction is VRD issuer registering transaction. With reference to FIG. 5, the data structure of the VRD issuer registering transaction includes fields of a transaction type with a value such as 3, a public key and a DID of the VRD issuer to be registered, and a signature and a DID of the VRD operator who registers the VRD issuer. As shown by "b1" in FIG. 1, the VRD issuer registering transaction is created by a VRD operator and then submitted to the distributed VRD transaction consensus network. In one embodiment, the VRD operator can be the first credential manager providing a VRD management node 21. The signature of the VRD operator can then be verified by the public key of the VRD operator stored in the distributed VRD transaction consensus network. With the predetermined consensus, the VRD issuer registering transaction is published to the distributed VRD ledger. As a result, the VRD issuer is capable of registering a VRD. In addition, the public key for the VRD issuer is stored in the distributed VRD transaction consensus network for verifying a signature of the VRD issuer. The VRD issuer's DID is a "string" data type and is a globally unique identifier that identifies the VRD issuer. For example, the VRD issuer's DID may be "vrd-issuer-01". The signature of the VRD operator registering the VRD issuer is generated by encrypting a hash value of hashing all other fields of the VRD issuer registering transaction with a private key of the VRD operator. In the present embodiment, the VRD operator registering the VRD issuer is the first credential manager providing the first credential management system 20 as indicated in FIG. 1. Parties that are susceptible to the authenticity of a VRD issuer can use the distributed VRD transaction consensus network 60 to look up the VRD issuer's DID and ascertain that the VRD issuer is indeed a valid VRD issuer registered by a valid VRD operator.

As shown in FIG. 2, the fourth type of VRD transaction is VRD issuer revoking transaction. With reference to FIG. 6, the data structure of the VRD issuer revoking transaction includes fields of a transaction type with a value such as 4, a DID of a registered VRD issuer, and a DID and a signature of the VRD operator who registered the VRD issuer. The signature of the VRD operator who registered the VRD issuer is generated by encrypting a hash value of hashing all other fields of the VRD issuer revoking transaction with a private key of the VRD operator who registered the VRD issuer. In the present embodiment, the VRD operator who registered the VRD issuer is the first credential manager. As indicated by "b2" in FIG. 1, the VRD issuer revoking transaction is created and submitted to the distributed VRD transaction consensus network by the first credential management system. The signature of the VRD operator can then be validated by a public key of the first credential manager stored in the distributed VRD transaction consensus network. With a predetermined consensus, the VRD issuer revoking transaction is published to the distributed VRD ledger. The previously registered VRD issuer identified by the DID of the VRD issuer is then revoked by the VRD operator who registered the VRD issuer. As a result, the VRD issuer can no longer capable of registering a VRD.

The fifth type of VRD transaction is VRD registering transaction. With reference to FIG. 7, the data structure of each of the at least one VRD registering transaction includes fields of a transaction type with a value such as 5, VRD ID, VRD name, and version of the VRD to be created, at least one of at least one attribute and at least one predicate, ID of the VRD operator who registering the VRD issuer to the distributed VRD transaction consensus network, and DID and signature of the VRD issuer. The VRD ID is a "string" data type and is a unique identifier, for example, "vrd-sprint-0000001". The VRD name is a "string" data type and is created to be meaningful for the purpose of verification, for example, "alcohol drinking age". The version of the VRD is a "real number" data type and represents a version of the VRD, for example 1.0 for version 1.0. The ID of the VRD operator is of a "string" data type. For example, the ID of the VRD operator can be "Sprint", the name of a telecom operator functioned as a VRD operator in one embodiment. In one embodiment, the ID of the VRD operator is used to route a request to a specific VRD operator that registered a VRD issuer. In this situation, the VRD issuer's wallet is stored at the VRD operator's site. Thus, only that VRD operator will be able to access the VRD issuer's wallet keys for signing the transaction.

The signature of the VRD issuer in the VRD registering transaction is generated by encrypting a hash value of hashing all other fields of the VRD registering transaction with a private key of the VRD issuer. As shown by "c1" in FIG. 1, the VRD registering transaction is created by a VRD issuer and then submitted from a VRD issuing device to the distributed VRD transaction consensus network. The signature of the VRD issuer can then be verified by the public key of the VRD issuer stored in the distributed VRD transaction consensus network. With a predetermined consensus, the VRD registering transaction is published to the distributed VRD ledger. As a result, the VRD can be retrieved by a verifier.

To support self-sovereign identity, in one embodiment, the private key of the VRD issuer can be divided into multiple share keys. The multiple share keys can be respectively stored in a VRD operating device provided by a VRD operator (in this embodiment, the first credential management system provided by the first credential manager) and the VRD issuing device provided by the VRD issuer. The private key of the VRD issuer can be reconstructed by combining the share keys held by the VRD issuer and the first credential manager according to a secret sharing scheme. In this situation, the VRD issuer's share key has to be combined with the VRD operator's share key to reconstruct the VRD issuer's private key before the creation of VRD issuing transaction. The signature of the VRD issuer can be generated with the reconstructed private key at the first credential manager. In one embodiment, the secret sharing scheme is Shamir's secret sharing scheme. After the VRD registering transaction is submitted to the distributed VRD transaction consensus network 60, the signature of the VRD issuer can be verified by the public key of the VRD issuer in the distributed VRD transaction consensus network 60. The registered VRD indicated by the VRD ID is then published to the distributed VRD ledger by the VRD issuer.

A difference between each VRD stored in the distributed VRD transaction consensus network 60 and its VRD registering transaction is that the VRD itself does not have the field of the signature of the VRD issuer.

The following description may involve examples for attributes, predicates and requirements associated with attributes and predicates, which are purely provided for purpose of exemplification. Each VRD registering transaction or each VRD is configured to have at least one attribute only, at least one predicate only, or both at least one attribute and at least one predicate at the same time. With reference to FIG. 8, each of the at least one attribute specifies one attribute of at least one identified credential of the credential owner and includes subfields of requirement, attribute name, and reveal option.

The requirement of the attribute describes at least one search condition to identify at least one credential that contains the attribute. In one embodiment, the at least multiple conditions of the requirement of the attribute may be combined with at least one Boolean operator. Each search condition in the requirement intends to specify a type of credential by a specific type of schema ID, such as {Schema_id=1} or a specific type of credential ID, such as {Credential_definition_id=7}, or a credential issued by a specific credential issuer, such as {Issuer id=5}. When a VRD has an attribute, for example 'First name', having one search condition, for example, {Schema id=1} specifying a US driver's license regardless of the state, the VRD requires the verification of the first name (attribute) of a U.S. driver's license (credential with specific schema id) of the credential owner. When the requirement of an attribute only has one search condition, no Boolean operator is required. However, when the requirement of an attribute, for example, 'Date of birth', has multiple search conditions, for example, {Credential_definition_id=1}, {Credential_definition_id=2}, and {Issuer_id=3}, the VRD requires the verification of date of birth (attribute) of a credential that meets all three search conditions. The multiple search conditions may be combined with one or more Boolean operators, such as 'AND' and 'OR' according to a verification need. As an example of the multiple search conditions combined with Boolean operators, {Credential_definition_id=1 OR [Credential_definition_id=2 AND Issuer_id=3]} is interpreted to require the date of birth of a credential whose Credential_definition_id is equal to 1, that is a California driver license, or a credential whose Credential_definition_id is equal to 2 and Issuer_id is equal to 3, that is a New York driver license issued by the NY State DMV, for verification. That is to say, the VRD requires verification of the date of birth from the credential owner's California driver license or New York driver license issued by the NY State DMV. In the current example, either one of these two credentials meets the three search conditions combined by two Boolean operators, and the date of birth from either credential can be used for verification.

The attribute name with a "string" data type specifies a specific type of attribute, such as name, date of birth, social security number, passport number, employer, and the like. The reveal option associated with the attribute name is a Boolean value, TRUE or FALSE, configured to permit or deny the value or the content of the attribute to be revealed. In one embodiment, the default value of the reveal option is FALSE. For example, if the attribute name is "date of birth" and the reveal option is TRUE, the content of the date of birth of the identified credential will be revealed in the proof.

Each predicate in a VRD requires the verification of whether a predicate character derived from or associated with an attribute of an identified credential meets a verification condition. The verification condition is a property of comparison relation against a predetermined value. For example, a predicate (age>=21) is to require the verification of age (predicate character) derived from the date of birth (predicate attribute) of a driver's license (identified credential) is equal to or larger than 21 (verification condition). The verification condition further includes a property of comparison relation (predicate type), such as larger than ">", equal to "=", smaller than "<", not smaller than ">=", and not larger than "<=", and a predicate value which is a predetermined number (predicate value). Other predicates include "Age<65", wherein "<65" is the verification condition, and "Education degree>=3", wherein ">=3" is the verification condition requiring the verification of a minimum master degree indicated by 3.

With further reference to FIG. 8, each of the at least one predicate includes subfields of requirement, predicate name, predicate character, predicate value, and predicate type. In one embodiment, each predicate further includes the subfield of predicate attribute from which the value of the predicate character is derived. The requirement in a predicate is similar to that in an attribute and is thus not repeated here. The attribute name is a "string" data type and is created to convey the meaning of the predicate, for example, "age verification". The predicate character in the predicate is a "string" data type and specifies a character derived from or associated with an attribute of the at least one credential identified by the requirement. For example, the predicate character "age" in the predicate "Age<65" can be derived from the predicate attribute "date of birth". The predicate value is an "integer" data type and specifies the value to be compared against by the value of the predicate character derived from an attribute, such as 65 in the above predicate. The predicate type is a "string" data type to specify the property of comparison relation between the value of the predicate character derived from the attribute of the identified credential and the predicate value, such as smaller than "<" in the above predicate.

The requirement of a predicate functions substantially the same as that of an attribute. When the requirement of a predicate has one search condition to identify at least one credential which contains the attribute used to derive the value of the predicate character. For example, the requirement of the predicate "Age<65" has one search condition "Schema_id=1", that is a U.S. driver's license regardless of the state. The date of birth of the U.S. driver's license of the credential owner is used to derive the value of the age which is compared against 65. Such a predicate in the VRD requires the verification of credential owner's age derived from his/her U.S. driver's license is smaller than 65. When the requirement of a predicate has multiple search conditions, such as {Credential_definition_id=1 OR [Credential_definition_id=2 AND Issuer_id=3]}, the VRD requires the verification of age (predicate character) derived from date of birth (attribute) of a credential that meets all three search conditions. The multiple search conditions may be combined with one or more Boolean operators, such as 'AND' and 'OR' according to a verification need. As an example of the multiple search conditions combined with Boolean operators, {Credential_definition_id=1 OR [Credential_definition_id=2 AND Issuer_id=3]} is interpreted to require the date of birth of a credential whose Credential_definition_id is equal to 1, that is a California driver license, or a credential whose Credential_definition_id is equal to 2 and Issuer_id is equal to 3, that is a New York driver license issued by the NY State DMV, for the age verification. That is to say, the VRD requires using the date of birth from the credential owner's California driver license or New York driver license issued by the NY State DMV for the verification of age predicate.

Since both the AND and OR Boolean operators can be used to combine multiple search conditions, one advantage of the present invention is to provide a more flexible and efficient approach for setting up the requirement associated with attribute or predicate for credential verification.

The sixth type of VRD transaction is VRD revoking transaction. With reference to FIG. 9, the data structure of each VRD revoking transaction includes fields of a transaction type with a value such as 6, DID and signature of the VRD issuer and ID of the VRD to be revoked. The signature of the VRD issuer in the VRD revoking transaction is generated by encrypting a hash value of hashing all other fields of the VRD revoking transaction with a private key of the VRD issuer. As shown by "c2" in FIG. 1, the VRD revoking transaction is created by the VRD issuer and submitted from the VRD issuing device to the distributed VRD transaction consensus network 60. The signature of the VRD issuer can then be verified by the public key of the VRD issuer in the distributed VRD transaction consensus network 60. With a predetermined consensus, the VRD revoking transaction is published to the distributed VRD ledger. The VRD identified by the ID of the VRD to be revoked is then removed by the VRD issuer identified by the DID of the VRD issuer from the distributed VRD transaction consensus network 60. As a result, the revoked VRD can no longer be used by a verifier.

The seventh type of VRD transaction is VRD retrieving transaction. The data structure of each VRD retrieving transaction includes fields of a transaction type with a value such as 7 and a VRD ID. As shown by "d1" in FIG. 1, the VRD retrieving transaction is submitted to the distributed VRD transaction consensus network from the first credential management system 20 provided by the first credential manager associated with the verifier. As a result, by "d2" shown in FIG. 1, the VRD is returned from the distributed VRD transaction consensus network 60 to the first credential management system 20.

Figure 10:
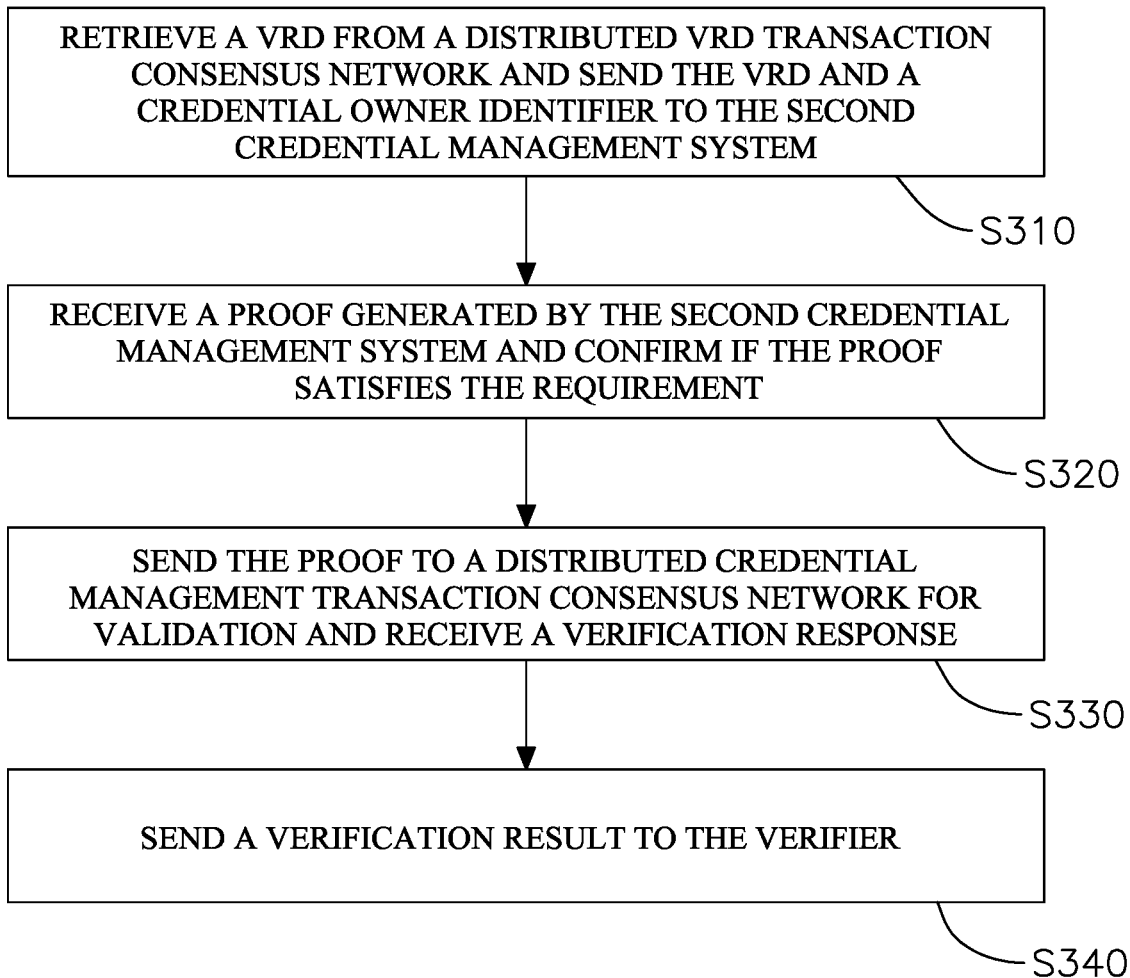
FIG. 10 is a flow diagram showing a method for a first credential management system using a VRD stored on a distributed VRD transaction consensus network to request credential verification of a credential owner in accordance with the present invention.

After the distributed VRD transaction consensus network is formed and VRDs are recorded therein, the method of using VRD to verify credentials will be discussed in details below. The first credential management system associated the verifier interacts the second credential management system associated with a credential owner (prover), with communication with the distributed VRD transaction consensus network and the distributed credential management transaction consensus network to verify credentials of credential owners. With reference to FIGS. 1 and 10, a method for a first credential management system using a VRD stored on a distributed VRD transaction consensus network to request credential verification of a credential owner is provided and includes the following steps.

Step S310: When receiving a VRD ID and a credential owner identifier, which are marked by d1 and d2 respectively as shown in FIG. 1, from a verifier device 50, the first credential management system 20 sends the VRD ID included in a VRD retrieving transaction to the distributed VRD transaction consensus network 60 to obtain the VRD indicated as d3 as shown in FIG. 1 and then sends the VRD and the credential owner identifier to a second credential management system 30. The VRD includes at least one attribute, at least one predicate, or both at least one attribute and at least one predicate. Each attribute and predicate have its own requirement defining at least one type of credential for verifying such attribute and predicate specified in the VRD.

Specifically, when a credential owner approaches a verifier with the verifier device 50, the verifier device 50 receives the credential owner identifier from the credential owner and provides a VRD ID and the credential owner identifier to the first credential management system 20. Each verifier device 50 may use a dedicated VRD ID for all credential owners or use multiple VRD IDs respectively for different multiple groups of credential owners and/or for different verification purposes. In the former case, the verifier device 50 always sends an identical VRD ID. In the latter case, the verifier device 50 provides the first credential management system 20 a corresponding VRD ID based on the group of credential owners and/or the verification purpose. In one embodiment, the verifier device 50 further provides the version of the VRD. As shown in FIG. 1, the first credential management system 20 then sends the VRD ID to the distributed VRD transaction consensus network 60 to retrieve a VRD (d3) from the distributed VRD transaction consensus network 60 with the VRD ID, and sends the VRD (d3) and the credential owner identifier (d2) to the second credential management system 30. The credential owner identifier includes a credential owner ID and an identifier of the second credential management system 30 associated with the credential owner. Thus, the first credential management system 20 can identify the second credential management system 30 based on the credential owner identifier and then sends the VRD and the credential owner identifier to the second credential management system 30. In one embodiment, the first credential management system 20 further sends proof request based on the attributes and predicates defined in the VRD to the second credential management system 30. The proof request specifies which attributes must be included in the proof to demonstrate the existence of credentials each of which contains the specified attribute. However, the proof request does not place any requirements on the credentials that can be used in the proof request.

As indicated earlier, each VRD can be configured to include at least one attribute, at least one predicate, or both at least one attribute and at least one predicate. Each of the at least one attribute includes an attribute name and a requirement that identifies at least one credential of the credential owner, which contains the attribute. Each of the at least one predicate in the VRD includes a predicate attribute (an attribute from which a predicate character can be derived) and a requirement that identifies at least one credential of the credential owner, which contains the predicate attribute for determining whether a verification condition of the predicate is met.

Step S320: The first credential management system 20 receives a proof from the second credential management system 30 and then confirms if the proof satisfies the requirement associated with each of the at least one attribute and the at least one predicate specified in the VRD.

Specifically, after receiving the VRD ID from the first credential management system 20, the second credential management system 30 generates an attribute and predicate list including the attribute name of each of the at least one attribute and the predicate attribute of each of the at least one predicate specified in the VRD. The second credential management system 30 determines the credential owner from the credential owner identifier which includes a credential owner ID, and then searches the credential owner's wallet for the credentials that meet the requirement corresponding to each attribute and predicate. The credential owner's credentials are encrypted and stored in a local database in a concept known as a wallet. In another embodiment, the credential owner's wallet can be managed by a third party or by the credential owner himself. The second credential owner management system searches through the credential owner's wallet by accessing the local database, to locate at least one credential which satisfies the requirements specified in the VRD.

The second credential management system 30 then creates a proof based on the proof request and these selected credentials through the distributed credential management transaction consensus network 70. As shown in FIG. 1, the second credential management system 30 sends the proof request, the attribute and predicate list (e1???), a credential identifier (e2???) of each of the at least one selected credential, and a handle to the credential owner's wallet to the distributed credential management transaction consensus network 70. The handle to the credential owner's wallet can be used to gain access to the credential owner's credentials. The credentials, along with the attributes and values, include "link secret", a mathematical value derived from the public keys of the credential owner and the credential issuer stored on the distributed credential management ledger for the credential owner, issuer, and the schema and credential definition. The second credential management system 30 then receives a proof (f1) back from the distributed credential management transaction consensus network 70.

In one embodiment, the Hyperledger Indy SDK can be used to construct the proof, which uses both the link secrets stored in the local credentials and the public keys of the credential owner and the credential issuer found on the distributed credential management ledger to construct zero knowledge proofs.

In one embodiment, a zero knowledge proof (ZKP) is created for each requested attribute and predicate specified in the VRD. These ZKPs can be verified by checking the public keys of the credential owner and the credential issuer found on the distributed credential management ledger. Each ZKP proves that a credential owner's credential is valid and non-revoked. In addition to the zero knowledge proofs, the proof includes the plaintext and/or value of each attribute that is requested to be revealed by the reveal option in the VRD. For example, if "Name" (attribute) was requested to be revealed, "John Doe" (plaintext of the attribute) will be included on the proof). The plaintext and/or value of each attribute is obtained directly from the credential.

Besides the at least one zero-knowledge proof, the proof further includes the credential identifier of each selected credential. When no credential of the credential owner can be identified to satisfy the requirement of each of the at least one attribute and the at least one predicate specified in the VRD, the second credential management system 30 simply sends an indication of failure (f2) to the first credential management system 20 without performing any process associated with the proof. Otherwise, the second credential management system 30 send the proof to the first credential management system 20.

The first credential management system 20 receives the proof from the second credential management system 30. The proof includes at least one credential identifier to identify the at least one selected credential that contains the attribute or predicate attribute specified in the VRD. The first credential management system 20 checks to confirm if the at least one credential indicated by the at least one credential identifier in the proof satisfies the requirement of each of at least one attribute and at least one predicate specified in the VRD. Such confirmation is conducted at the first credential management system 20 only. However, it does not confirm if the credential owner actually owns the at least one selected credential which is valid and non-revoked.

Step S330: When each requirement is satisfied, the first credential management system 20 sends the proof and at least one of the at least one attribute and the at least one predicate specified in the VRD to a distributed credential management transaction consensus network for validation.

Specifically, when each requirement is satisfied, the first credential management system 20 sends the proof (f1) and the attribute name of each of the at least one attribute and the predicate attribute of each of the at least one predicate specified in the VRD, which is identical to the attribute and predicate list (e1) generated at the second credential management system 30, to the distributed credential management transaction consensus network 70 for validation.

When receiving the indication of failure, the first credential management system 20 sends a verification result of failure indicating that the credential owner has no credential satisfying the requirement of the at least one attribute and the at least one predicate specified in the VRD to the verifier device 50 and terminates the remaining step of the method.

Step S340: Upon receiving a verification response from the distributed credential management transaction consensus network, the first credential management system 20 sends a credential verification result to the verifier device 50.

Specifically, upon receiving a verification response (g1) from the distributed credential management transaction consensus network 70, the first credential management system 20 sends a verification result (g2) to the verifier device 50. As being a mathematical value, each of the at least one zero-knowledge proof for a corresponding attribute name or a corresponding predicate attribute in the proof can be validated against the public keys of the credential owner and the credential issuer stored on the distributed credential management transaction consensus network 70 for the credential owner, credential issuer, and the schema and credential definition associated with at least one credential in the proof. The validation of each zero-knowledge proof generates a Boolean value, TRUE or FALSE, indicating that the at least one credential containing the attribute of a corresponding attribute or the predicate attribute of a corresponding predicate is valid and non-revoked. The verification response includes the Boolean value indicating the validation result of each zero-knowledge proof. For example, if the VRD includes the attribute name of an attribute, for example "First name", and the credential identified by the requirement of the attribute, for example {Schema_id=1}, is a U.S. driver's license, a TRUE value of a corresponding zero-knowledge proof validation means that the credential owner owns a U.S. driver license credential containing the first name, which is valid and non-revoked. Moreover, if the predicate is 'Age<65' and the credential identified by the requirement of the predicate, for example {Schema_id=1}, is a U.S. driver's license, a FALSE value of a corresponding zero-knowledge proof validation means that the U.S>driver's license credential is invalid or revoked. Based on the verification response, the verification result is then sent from the first credential management system 20. The verification result can also be a Boolean value—TRUE for passing the verification and FALSE for failing the verification specified in the VRD. In another embodiment, the verification result may be a customized report with the verification response modified according to verifier's demands.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for a first credential management system using a verification requirement document (VRD) stored on a distributed VRD transaction consensus network to request credential verification of a credential owner, the method comprising:
   (a) when receiving a VRD ID of the VRD and a credential owner identifier from a verifier device, the first credential management system sending the VRD ID to the distributed VRD transaction consensus network to retrieve the VRD, and sending the VRD and the credential owner identifier to a second credential management system, wherein the VRD includes at least one attribute, at least one predicate, or both at least one attribute and at least one predicate with a requirement defining at least one type of credential for verifying each of the at least one attribute and each of the at least one predicate specified in the VRD.

2. The method of claim 1, further comprising:
   (b) the first credential management system receiving a proof from the second credential management system and confirming if the proof satisfies the requirement associated with each of the at least one attribute and the at least one predicate specified in the VRD;
   (c) when each requirement is satisfied, the first credential management system sending the proof and at least one of the at least one attribute and the at least one predicate specified in the VRD to a distributed credential management transaction consensus network for validation;
   (d) upon receiving a verification response from the distributed credential management transaction consensus network, the first credential management system sending a credential verification result to the verifier device.

3. The method of claim 2, further comprising: the second credential management system selecting at least one credential of the credential owner, which satisfies the requirement of each of the at least one attribute and the at least one predicate specified in the VRD, sending each of the at least one attribute and the at least one predicate specified in the VRD and a credential identifier of each of the at least one selected credential to the distributed credential management transaction consensus network, and sending the proof received from the distributed credential management transaction consensus network to the first credential management system.

4. The method of claim 2, wherein the VRD has fields of VRD ID, VRD name, at least one of the at least one attribute and the at least one predicate, and DID of the VRD issuer.

5. The method as claimed in claim 4, wherein each of the at least one attribute includes a corresponding requirement, an attribute name, and a reveal option, and the corresponding requirement defines the at least one type of credential of the credential owner and includes at least one search condition.

6. The method as claimed in claim 5, wherein the at least one search condition comprises multiple search conditions that are combined by an OR Boolean operator.

7. The method as claimed in claim 5, wherein when the reveal option of the at least one attribute specified in the VRD permits reveal, the proof includes a value or content of the at least one attribute.

8. The method as claimed in claim 5, wherein when the reveal option of the at least one attribute specified in the VRD permits reveal, the verification result includes a value or content of the at least one attribute.

9. The method as claimed in claim 2, wherein each of the at least one predicate specified in the VRD includes a corresponding requirement, a predicate name, a predicate character, a predicate attribute, a predicate value, and a predicate type, the corresponding requirement defines the at least one type of credential of the credential owner and includes at least one search condition.

10. The method as claimed in claim 9, wherein the at least one search condition comprises multiple search conditions that are combined by an OR Boolean operator.

11. The method as claimed in claim 2, wherein the proof includes a zero-knowledge proof corresponding to each of the at least one attribute and the at least one predicate specified in the VRD for verifying that the selected is valid and non-revoked.

12. The method of claim 1, wherein the credential owner identifier comprises a credential owner ID and an identifier of the second credential management system associated with the credential owner.

13. The method as claimed in claim 1, wherein the distributed VRD transaction consensus network and the distributed credential management transaction consensus network are blockchains.

14. The method as claimed in claim 1, wherein the distributed VRD transaction consensus network and the distributed credential management transaction consensus network are separated networks.

15. The method as claimed in claim 1, wherein the distributed VRD transaction consensus network is integrated into the distributed credential management transaction consensus network.

16. A distributed verification requirement document (VRD) transaction consensus network maintaining a distributed VRD ledger, the network comprises:
 a VRD administration system provided by a VRD administer;
 a first VRD management node provided by a first VRD operator;
 a second VRD management node provided by a second VRD operator;
 wherein a VRD administration system, the first VRD management node, and the second VRD administration are communicatively connected;
 wherein after a VRD transaction is validated by a predetermined consensus of the distributed VRD transaction consensus network, the VRD transaction is published to the distributed VRD ledger, and the VRD transaction is one of VRD operator registering transaction, VRD operator revoking transaction, VRD issuer registering transaction, VRD issuer revoking transaction, VRD registering transaction, VRD revoking transaction, and VRD retrieving transaction; and
 wherein the distributed VRD ledger records multiple VRDs and each VRD has fields of VRD ID, VRD name, at least one of at least one attribute and at least one predicate, and DID of the VRD issuer.

17. The network as claimed in claim 16, wherein the VRD operator registering transaction comprises public key and DID of a VRD operator, and DID and signature of a VRD administer to publish a VRD operator.

18. The network as claimed in claim 16, wherein the VRD operator revoking transaction comprises DID of a VRD operator, and DID and signature of a VRD administer who registered the VRD operator to revoke the VRD operator.

19. The network as claimed in claim 16, wherein the VRD issuer registering transaction comprises public key and DID of a VRD issuer, and DID and signature of a VRD operator to publish the VRD issuer.

20. The network as claimed in claim 16, wherein the VRD issuer revoking transaction includes DID of a VRD issuer, and DID and signature of a VRD operator who registered the VRD issuer to revoke the VRD issuer.

21. The network as claimed in claim 16, wherein the VRD registering transaction has fields of VRD ID, VRD name, at least one of at least one attribute and at least one predicate, and DID and signature of a VRD issuer.

22. The network as claimed in claim 21, wherein each of the at least one attribute specified in the VRD registering transaction includes a corresponding requirement, an attribute name, and a reveal option, and the corresponding requirement defines the at least one type of credential of the credential owner and includes at least one search condition.

23. The network as claimed in claim 22, wherein the at least one search condition comprises multiple search conditions that are combined by an OR Boolean operator.

24. The network as claimed in claim 21, wherein each of the at least one predicate specified in the VRD registering transaction includes a corresponding requirement, a predicate name, a predicate character, a predicate attribute, a predicate value, and a predicate type, and the corresponding requirement defines the at least one type of credential of the credential owner and includes at least one search condition.

25. The network as claimed in claim 24, wherein the at least one search condition comprises multiple search conditions that are combined by an OR Boolean operator.

26. The network as claimed in claim 16, wherein the VRD revoking transaction has fields of signature and DID of a VRD issuer that registered a VRD, and ID of the registered VRD.

27. The network as claimed in claim 16, wherein the distributed VRD transaction consensus network is a blockchain.

* * * * *